United States Patent
Channabasavaiah et al.

(10) Patent No.: US 9,424,540 B2
(45) Date of Patent: Aug. 23, 2016

(54) IDENTIFYING SERVICE ORIENTED ARCHITECTURE SHARED SERVICE OPPORTUNITIES

(75) Inventors: Kishore Channabasavaiah, Palatine, IL (US); Kenneth R. Heard, Plano, TX (US); Kerrie L. Holley, Montara, CA (US); Pranav Jhumkhawala, Fremont, CA (US); Pawan Khera, Seattle, WA (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 12/431,815

(22) Filed: Apr. 29, 2009

(65) Prior Publication Data

US 2010/0280856 A1    Nov. 4, 2010

(51) Int. Cl.
*G06Q 10/00*    (2012.01)
*G06F 9/44*    (2006.01)
*G06Q 10/06*    (2012.01)

(52) U.S. Cl.
CPC ........ *G06Q 10/06* (2013.01); *G06Q 10/06313* (2013.01)

(58) Field of Classification Search
USPC .............................................................. 705/7
See application file for complete search history.

(56) References Cited

U.S. PATENT DOCUMENTS

| | | | |
|---|---|---|---|
| 5,408,663 A * | 4/1995 | Miller .................... | G06Q 10/06 718/104 |
| 5,826,252 A * | 10/1998 | Wolters, Jr. ...... | G06Q 10/06313 705/301 |
| 6,427,132 B1 | 7/2002 | Bowman-Amuah | |
| 7,188,170 B1 * | 3/2007 | Burnley .............. | G06F 11/3419 702/186 |
| 7,613,623 B2 * | 11/2009 | Nemecek ............. | G06Q 10/063 705/7.11 |
| 7,630,965 B1 * | 12/2009 | Erickson ................... | G06F 8/71 |
| 8,024,397 B1 * | 9/2011 | Erickson ............... | G06F 9/5055 707/602 |
| 8,255,254 B2 * | 8/2012 | Kumar .................... | G06Q 10/06 705/28 |
| 8,407,078 B1 * | 3/2013 | Caputo .................. | G06Q 10/06 705/7.27 |
| 8,666,794 B1 * | 3/2014 | Alletto-Walton ...... | G06Q 10/06 705/7.16 |
| 8,874,456 B2 * | 10/2014 | Lakritz .................. | G06Q 10/06 705/7.12 |
| 2003/0135399 A1 * | 7/2003 | Ahamparam .... | G06Q 10/06313 705/7.28 |

(Continued)

OTHER PUBLICATIONS

Low, M. et al., "Symbiotic Simulation for Business Process Re-Engineering in High-Tech Manufacturing and Service Networks," IEEE Proceedings of the 39th Conference on Winter Simulation (2007), pp. 568-576.

(Continued)

*Primary Examiner* — Ashford S Hayles
(74) *Attorney, Agent, or Firm* — Maeve M. Carpenter; Hunter E. Webb; Keohane & D'Alessandro PLLC (57) ABSTRACT

An approach that identifies a service oriented architecture (SOA) shared service opportunity is provided. In one embodiment, there is an opportunity tool, including an identification component configured to identify a plurality of projects from each of a plurality of lines of business; a selection component configured to select a set of projects common to more than one line of business from the plurality of lines of business; and an evaluation component configured to evaluate the set of projects common to more than one line of business from the plurality of lines of business to identify a SOA shared service opportunity.

20 Claims, 4 Drawing Sheets

(56) References Cited

U.S. PATENT DOCUMENTS

| | | | |
|---|---|---|---|
| 2004/0260588 A1* | 12/2004 | Bowen | G06Q 10/06311 705/7.13 |
| 2005/0043977 A1* | 2/2005 | Ahern | G06Q 10/06 705/7.22 |
| 2006/0010418 A1* | 1/2006 | Gupta | G06Q 10/0631 717/101 |
| 2006/0053043 A1* | 3/2006 | Clarke | G06Q 10/063118 705/7.17 |
| 2006/0136871 A1* | 6/2006 | O'Connor | G06Q 10/06 717/113 |
| 2006/0235733 A1* | 10/2006 | Marks | G06Q 10/06 705/70 |
| 2007/0022404 A1* | 1/2007 | Zhang | G06Q 10/06 717/103 |
| 2007/0112945 A1* | 5/2007 | Brown | G06Q 10/06 709/223 |
| 2008/0066048 A1* | 3/2008 | Hafermann | G06Q 10/00 717/100 |
| 2008/0066072 A1* | 3/2008 | Yurekli | G06Q 10/06 718/104 |
| 2008/0069082 A1* | 3/2008 | Patrick | H04L 41/145 370/351 |
| 2008/0126406 A1* | 5/2008 | Endabetla | G06Q 10/06 |
| 2008/0270205 A1* | 10/2008 | Kumar | G06Q 10/06 705/7.13 |
| 2008/0294408 A1* | 11/2008 | Padmanabhan | G06Q 10/02 703/13 |
| 2008/0300945 A1* | 12/2008 | Simpson | G06Q 10/06 705/7.23 |
| 2008/0301713 A1* | 12/2008 | Demarest | G06Q 10/10 719/317 |
| 2009/0006167 A1* | 1/2009 | Toussaint | G06Q 10/06 705/7.27 |
| 2009/0049040 A1* | 2/2009 | Fay | G06F 17/30734 |
| 2009/0055466 A1* | 2/2009 | Hadas | G06Q 10/06 709/202 |
| 2009/0064087 A1* | 3/2009 | Isom | G06F 8/10 717/101 |
| 2009/0112644 A1* | 4/2009 | Isom | G06Q 10/0633 705/7.27 |
| 2009/0132708 A1* | 5/2009 | Hayward | G06F 9/5055 709/226 |
| 2009/0192867 A1* | 7/2009 | Farooq | G06Q 10/06 705/7.29 |
| 2009/0204660 A1* | 8/2009 | Chappell | G06F 9/4425 709/201 |
| 2009/0222310 A1* | 9/2009 | Vollmer | G06Q 10/06313 705/7.23 |
| 2009/0234689 A1* | 9/2009 | Simon | G06Q 10/00 708/505 |
| 2009/0254572 A1* | 10/2009 | Redlich | G06Q 10/06 |
| 2009/0276771 A1* | 11/2009 | Nickolov | G06F 9/4856 717/177 |
| 2009/0319312 A1* | 12/2009 | Moerdler | G06Q 10/00 705/7.28 |
| 2010/0030890 A1* | 2/2010 | Dutta | G06Q 10/06 709/224 |
| 2010/0049628 A1* | 2/2010 | Mannava | G06Q 10/10 705/26.1 |
| 2010/0058334 A1* | 3/2010 | Mohindra | G06F 9/5077 718/1 |
| 2010/0070291 A1* | 3/2010 | Handy | G06Q 10/06 705/1.1 |
| 2010/0070542 A1* | 3/2010 | Feinsmith | G06Q 10/10 707/812 |
| 2010/0083145 A1* | 4/2010 | Schang | G06Q 10/06 715/760 |
| 2010/0095266 A1* | 4/2010 | Novak | G06F 8/71 717/101 |
| 2010/0161629 A1* | 6/2010 | Palanisamy | G06F 17/30893 707/756 |
| 2010/0250322 A1* | 9/2010 | Norwood | G06Q 10/06 705/7.21 |
| 2010/0262653 A1* | 10/2010 | Chaffee | G06Q 10/06 709/203 |
| 2010/0268561 A1* | 10/2010 | Enright | G06Q 10/06 705/7.36 |
| 2012/0310710 A1* | 12/2012 | Brown et al. | 705/7.37 |
| 2013/0096971 A1* | 4/2013 | Gupta | G06Q 10/063114 705/7.15 |

OTHER PUBLICATIONS

Schepers, T.G.J. et al., "A lifecycle approach to SOA governance," Proceedings of the 2008 ACM Symposium on applied computing, Mar. 16-20, Fortaleza, Ceara, Brazil, pp. 1055-1061.

Huang, P. et al., "Utilizing Simulation to Evaluate Business Decisions in Sense-and-Respond Systems," IEEE Proceedings of the 36th Conference on Winter Simulation (2004), pp. 1205-1212.

Dan et al., "Information as a Service: Modeling and Realization", International Workshop on Systems Development in SOA Environments, 2007, 6 pages.

* cited by examiner

IDENTIFYING SERVICE ORIENTED ARCHITECTURE SHARED SERVICE OPPORTUNITIES

FIELD OF THE INVENTION

This invention relates generally to service oriented architecture (SOA) shared service lifecycle management and more specifically to the identification of SOA shared service opportunities.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Deconstructing and understanding business architectures to successfully deliver enterprise services is a complex undertaking for all businesses. Many prior art approaches delay identification of business opportunities for service orientations, which has a negative impact on project delivery and budget. Further, the longer the delay in identification of business opportunities for service orientation, the more difficult it becomes to change the course of portfolio planning activities.

SUMMARY OF THE INVENTION

In one embodiment, there is a method for identifying a service oriented architecture (SOA) shared service opportunity. In this embodiment, the method comprises: identifying a plurality of projects from each of a plurality of lines of business; selecting a set of projects common to more than one line of business from the plurality of lines of business; and evaluating the set of projects common to more than one line of business from the plurality of lines of business to identify a SOA shared service opportunity.

In a second embodiment, there is a system for identifying a service oriented architecture (SOA) shared service opportunity. In this embodiment, the system comprises at least one processing unit, and memory operably associated with the at least one processing unit. An opportunity tool is storable in memory and executable by the at least one processing unit. The opportunity tool comprises: an identification component configured to identify a plurality of projects from each of a plurality of lines of business; a selection component configured to select a set of projects common to more than one line of business from the plurality of lines of business; and an evaluation component configured to evaluate the set of projects common to more than one line of business from the plurality of lines of business to identify a SOA shared service opportunity.

In a third embodiment, there is a computer-readable medium storing computer instructions, which when executed, enables a computer system to identify a service oriented architecture (SOA) shared service opportunity, the computer instructions comprising: identifying a plurality of projects from each of a plurality of lines of business; selecting a set of projects common to more than one line of business from the plurality of lines of business; and evaluating the set of projects common to more than one line of business from the plurality of lines of business to identify a SOA shared service opportunity.

In a fourth embodiment, there is a method for deploying an opportunity tool for use in a computer system that identifies a service oriented architecture (SOA) shared service opportunity. In this embodiment, a computer infrastructure is provided and is operable to: identify a plurality of projects from each of a plurality of lines of business; select a set of projects common to more than one line of business from the plurality of lines of business; and evaluate the set of projects common to more than one line of business from the plurality of lines of business to identify a SOA shared service opportunity.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to identifying a service oriented architecture (SOA) shared service opportunity. In these embodiments, an opportunity tool provides this capability. Specifically, the opportunity tool comprises an identification component configured to identify a plurality of projects from each of a plurality of lines of business; a selection component configured to select a set of projects common to more than one line of business from the plurality of lines of business; and an evaluation component configured to evaluate the set of projects common to more than one line of business from the plurality of lines of business to identify a SOA shared service opportunity.

Figure 1:
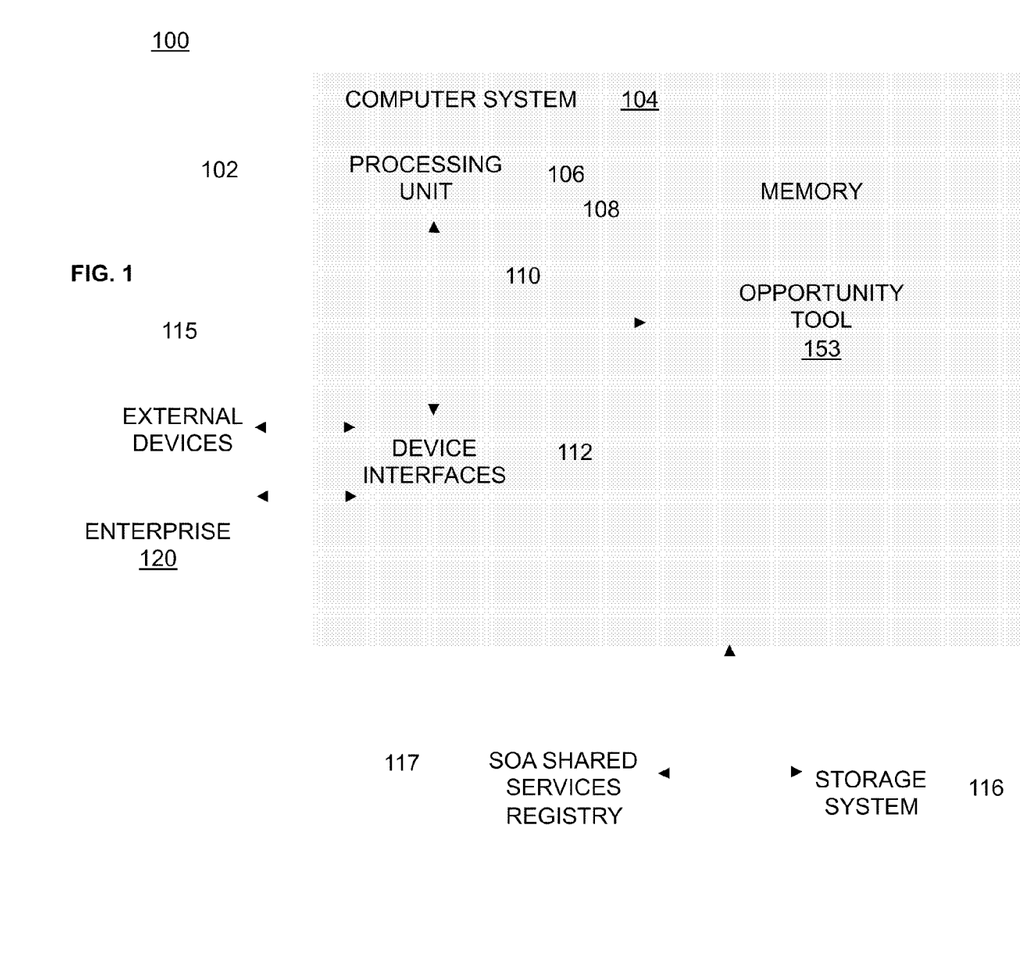
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for identifying a SOA shared service opportunity. It should be understood that any other computers implemented under the present invention may have different components/software, but will perform similar functions. As shown, computer system 104 includes a processing unit 106, memory 108 for storing an opportunity tool 153, a bus 110, and device interfaces 112.

Processing unit 106 collects and routes signals representing outputs from external devices 115 (e.g., a keyboard, a pointing device, a display, a graphical user interface, etc.) to opportunity tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating opportunity tool 153, which is stored in memory 108 and/or storage system 116. While executing computer program code, processing unit 106 can read and/or write data to/from memory 108, storage system 116, and a SOA shared services registry 117. SOA shared services registry 117 stores a plurality of potential SOA shared services and associated metadata, as well as rules against which the metadata is compared to locate, update, and store SOA shared services from decomposed business architectures, as will be further described below. Storage system 116 may also comprise a plurality of projects (e.g., business initiatives, goals, plans, etc.) from each of a plurality of lines of business of an enterprise 120. Storage system 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Implementation 100 and opportunity tool 153 operate within a broader SOA shared services and lifecycle management process (not shown), which identifies, evaluates, implements, and manages SOA shared services. SOA SSLMP provides guidance for decomposing a business architecture of an enterprise and managing the entire lifecycle of a shared service(s) within the enterprise. Specifically, SOA shared services and lifecycle management process (SSLMP) includes new and distinct roles, governance checkpoints, increased collaboration requirements, and new decision control points. SOA SSLMP takes an extended view in identifying the various touch-points inside and outside of the organization to plan, build and manage shared services within a SOA shared services portfolio. SOA SSLMP defines a framework for shared services governance and lifecycle management that provides a formal approach and structure to enable the decomposition of business architectures to define, design, implement and manage an enterprise services portfolio. This framework allows enterprises to define or leverage existing processes and methodologies to decompose business architectures to deliver a comprehensive portfolio of enterprise services.

Figure 2:
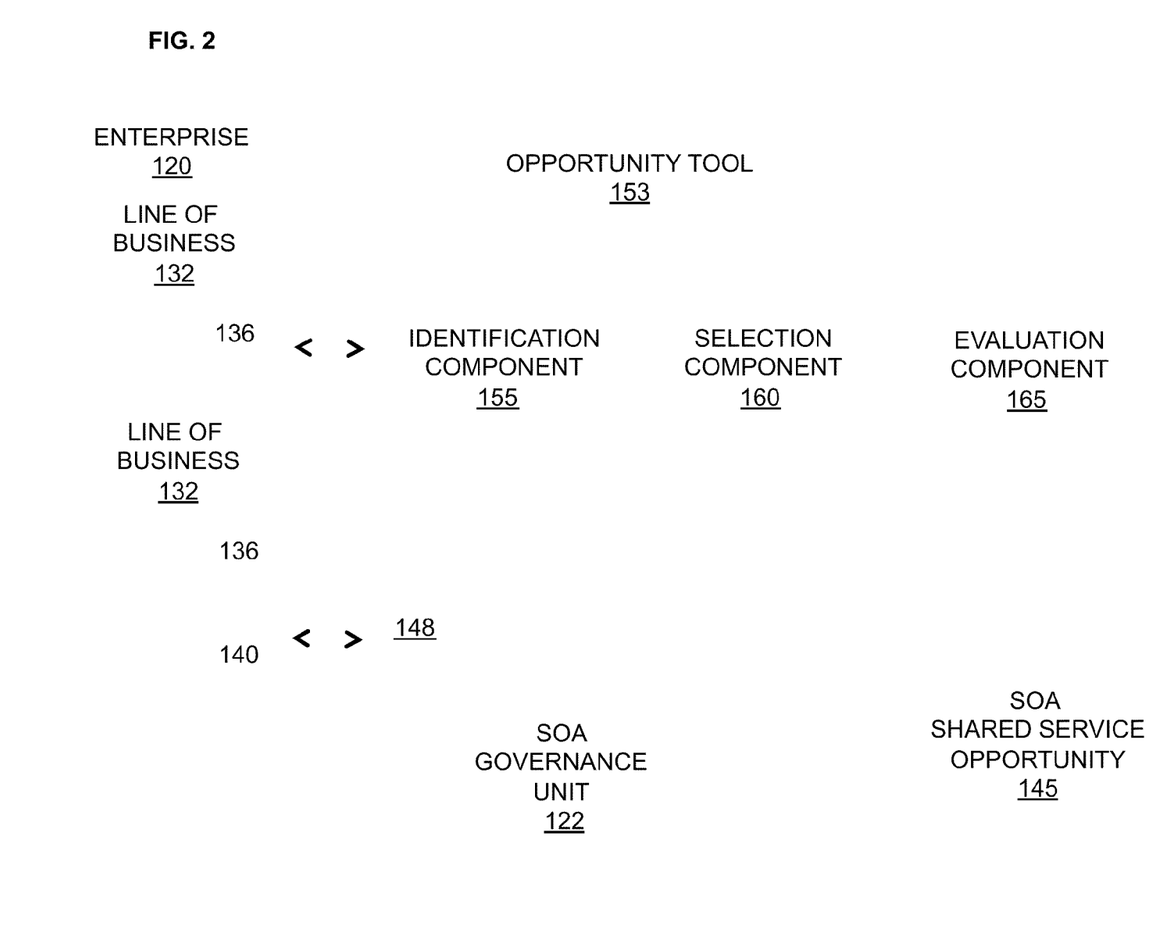
FIG. 2 shows an opportunity tool that operates in the environment shown in FIG. 1.

Referring now to FIG. 2, a more detailed view of opportunity tool 153, which identifies SOA shared service opportunities (i.e., components/areas with the potential for re-use within the enterprise to minimize duplication of resources) will be provided. As shown, opportunity tool 153 comprises an identification component 155 configured to identify a plurality of projects 136 from each of a plurality of lines of business (LOB) 132 (e.g., a business component, unit, or group within enterprise 120). Typically, as part of an annual planning process within enterprise 120, each LOB 132 identifies the various business projects they plan to undertake for the year. The LOBs 132 prioritize the projects in terms of impact, resources, budget, etc., and conduct a high-level business case for each project. It is typical that each of plurality of LOB 132 will have overlapping projects common to multiple LOBs, which are then discussed and analyzed at larger meetings held within enterprise 120.

In an exemplary embodiment, opportunity tool 153 comprises a selection component 160 configured to select a set of projects 140 common to more than one LOB from plurality of lines of business 132. To assist with this, as shown in FIG. 2, a SOA governance unit 122 provides input to identify plurality of projects 136 from each of plurality of lines of business 132 and to select set of projects 140 common to more than one LOB from plurality of LOB 132. In the present invention, SOA governance unit 122 works with each LOB 132 during the planning phase to identify the impact of each business project from a SOA/IT perspective. It will be appreciated that SOA governance unit 122 described herein may represent a committee or group of individuals within an organization, or may represent a module, segment, or portion of code, which comprises one or more executable instructions for evaluating and managing the SOA shared service.

Figure 3:
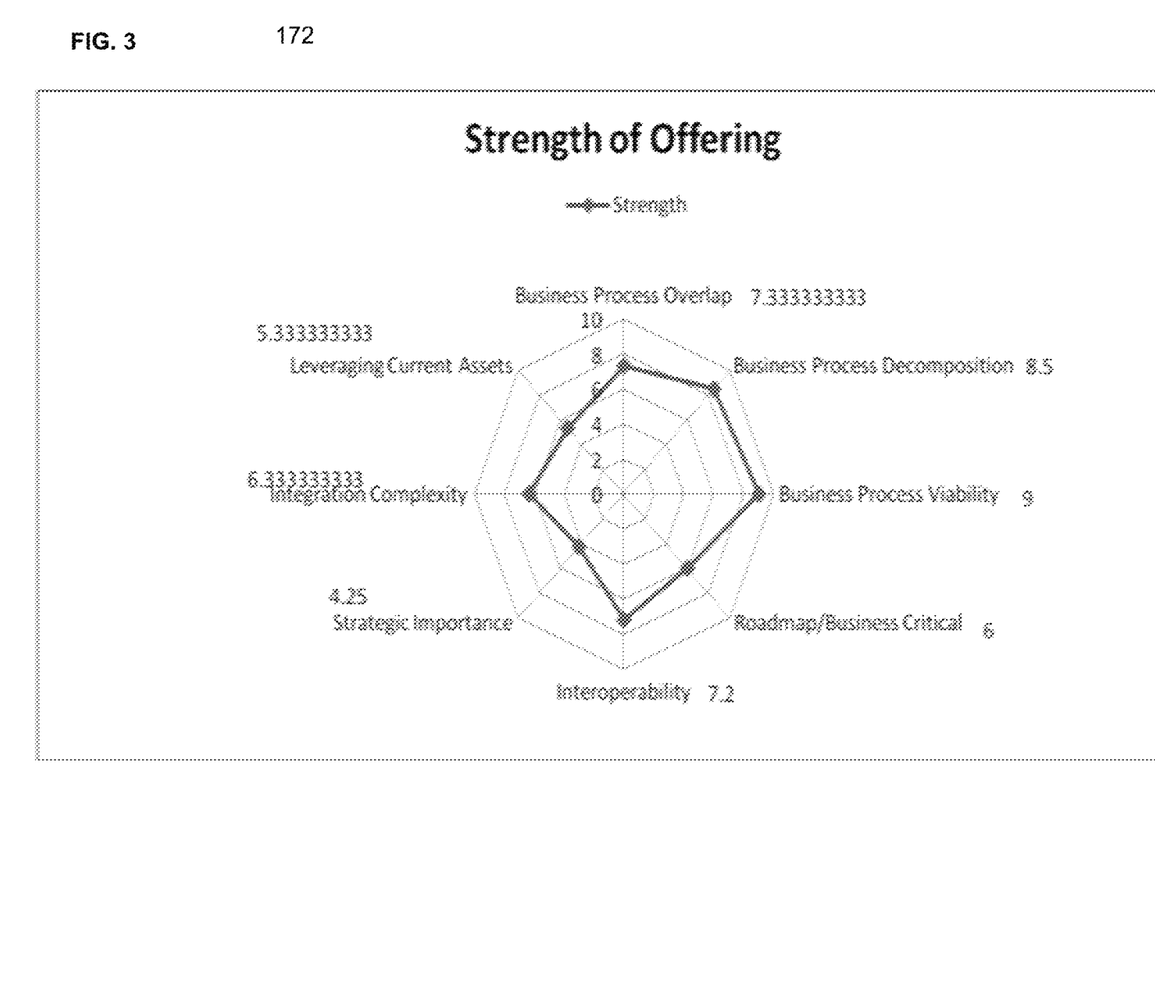
FIG. 3 shows an exemplary metric for rating each of a plurality of projects from each of a plurality of lines of business.

In one embodiment, SOA governance unit 122 may create a questionnaire having qualification criteria to help prioritize projects within each LOB. Each project may be prioritized using a weighted technique to show the initial priority of each project, and a metric 172 may be created, as shown in FIG. 3. Metric 172 quantifies the project in terms of business, technology and application, in this case, on a scale of 1-10, with 10 indicating full compliance with the business objectives of the LOB. Based on metric 172, SOA governance unit 122 evaluates each of plurality of projects 136 to prioritize set of business projects 140 common to more than one LOB from plurality of lines of business 132. From this, an evaluation component 165 (FIG. 2) evaluates set of projects 140 common to more than one LOB from plurality of LOB 132 to identify a SOA shared service opportunity 145. For example, as shown in FIG. 3, each project may be rated to get an overview of the strength of the project offering in terms of SOA. In this case, metric 172 has a strong business and technology driver, but a significantly lower application score (i.e., strategic importance and leveraging of current assets). This may indicate that the project does not reduce redundancy or increase efficiency, and applications that involve the project may not be ready for SOA shared service integration.

Next, based on the evaluation, SOA governance unit 122 coordinates communication between each of plurality of LOB 132 to help prioritize projects and plan for integration. Specifically, SOA governance unit 122 coordinates meetings between each of plurality of LOB 132 and IT personnel capable of integrating SOA shared services. Typically, results from each of these meetings are input to more comprehensive meetings to evaluate projects on an enterprise-wide scale. The long-term strategies and initiatives are discussed for each of set of projects 140 common to more than one LOB to select projects that will be implemented by enterprise 120.

Next, as shown in FIG. 2, each LOB 132 prepares a high-level business case 148 for the selected projects. In one example, high-level business case 148 could be a document or presentation prepared by each LOB 132, which includes the background of the project, the expected business benefits, the options considered (with reasons for rejecting or carrying forward each option), the expected cost of the project, a gap analysis, and the expected risks. To accomplish this, evaluation component 165 is configured to prepare business case 148 for the SOA shared service opportunity, and prioritize set of projects 140 common to more than one line of business from plurality of lines of business 132 based on business case 148 for SOA shared service opportunity 145. SOA governance unit 122 is involved with these steps as well, assisting with business case 148, project prioritization, project funding, etc.

Figure 4:
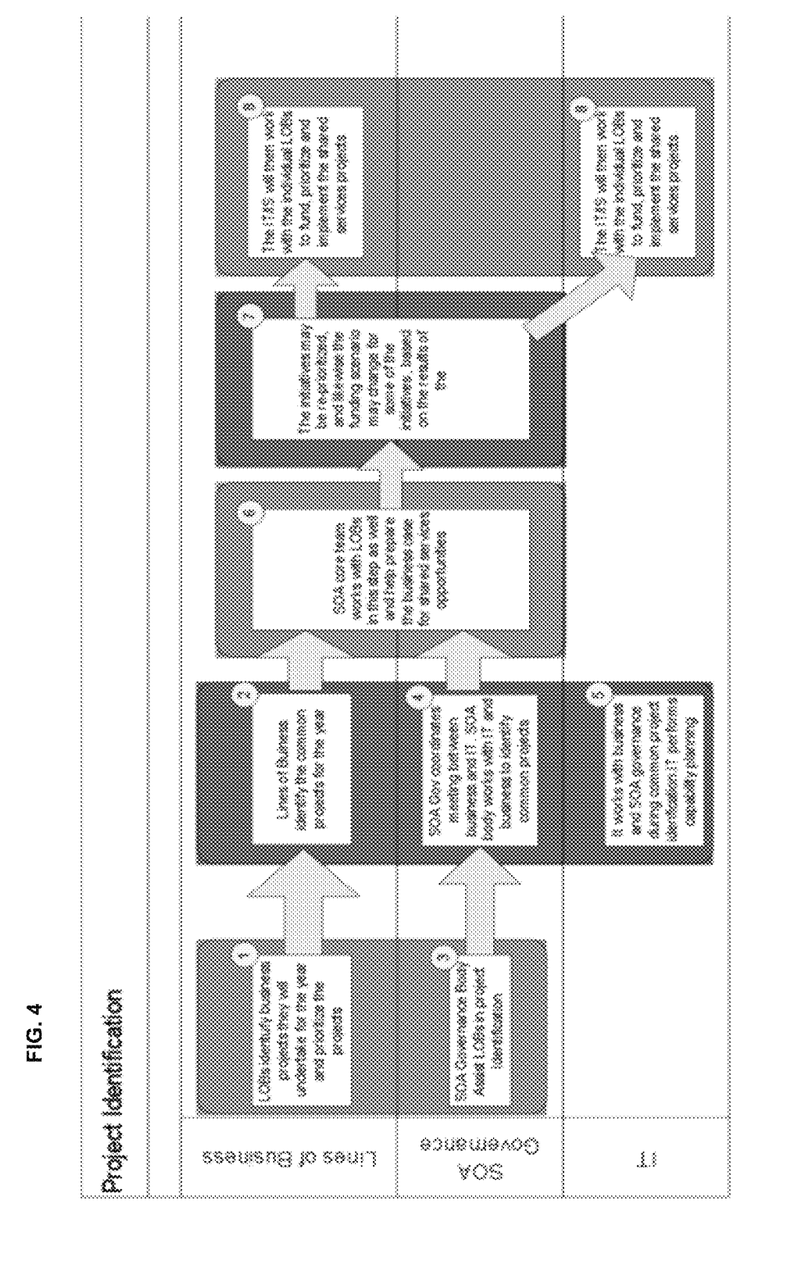
FIG. 4 shows a flow diagram of a method for identifying a SOA shared service opportunity according to embodiments of the invention.

Referring now to FIG. 4, a SOA services lifecycle management process (SLMP) for identifying a SOA shared service opportunity will be described in further detail. As shown, at point 1, each LOB identifies and prioritizes business projects they will undertake for the year. At point 2, the business projects common to more than one LOB are identified. The SOA governance body assists with the identification of common projects, as shown at point 3. At point 4, the SOA governance body coordinates meetings between the LOBs and IT to identify common projects. At point 5, IT works with the LOBs and the SOA governance body during common project identification, including performing capability planning. SOA core team works with the LOBs to help prepare the business case for shared service opportunities, as shown at point 6. Next, at point 7 the business projects may be re-prioritized, along with the associated funding allocations. At point 8, IT works with the individual LOBs to fund, prioritize, and implement the SOA shared service projects.

It will be appreciated that the approach shown in of FIG. 4 represents one possible implementation of a process flow for identifying a SOA shared service opportunity. SOA SLMP flow illustrates the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to identify a SOA shared service, as shown in FIG. 1. In this case, opportunity tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for identifying a SOA shared service opportunity. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for minimizing duplication of resources in an enterprise system having a computer-based governance unit having computer executable instructions and a computer system installed on the enterprise system having a plurality of resources, the method comprising:

identifying, by the shared services computer, a plurality of projects for each of a plurality of lines of business based on input from a SOA governance unit regarding availability of a resource passed from a device, each of the plurality of projects being a project that is proposed to be undertaken;

comparing by each line of business, each of the plurality of projects to qualification criteria created by the SOA governance unit to determine, by the computer, a measure of compliance with a set of business objectives of each of the plurality of projects for each of the plurality of lines of business;

generating, by the computer, a metric quantifying the measure of compliance with the set of business objectives of each of the plurality of projects for each of the plurality of lines of business, the metric being a web graph metric;

prioritizing, by each line of business, each of the plurality of projects for each of the plurality of lines of business based on the metric;

preparing, by the computer, a high level business case for each of the plurality of projects, wherein each high level business case is prepared by a corresponding line of business, and wherein each high level business case receives oversight from the SOA governance unit;

selecting, by the computer, based on the high level business case for each of the plurality of projects, a set of projects from the plurality of projects for each of the plurality of lines of business common to more than one line of business from the plurality of lines of business;

re-prioritizing, by the shared services computer, the plurality of projects for each of the plurality of lines of business selected as common to more than one line of business;

evaluating, by the computer, the set of projects common to more than one line of business from the plurality of lines of business, based on the re-prioritization of the plurality of projects, to identify an optimum common project as a service oriented architecture (SOA) shared service opportunity;

building, by the shared services computer, the optimum common project as a shared service that is software code that re-uses components and merges duplicated resources and provides a common project across the multiple lines of business together with an associated lifecycle management process that includes new and distinct roles, governance checkpoints, increased collaboration requirements, and new decision control points using touch-points inside and outside of the organization within a SOA shared services plan;

modifying one or more existing systems in the infrastructure to deploy the optimum common project into an enterprise services portfolio that performs a shared service within the enterprise services portfolio for the more than one line of business; and managing the optimum common project as a shared service within the SOA based on the touchpoints and checkpoints.

2. The method according to claim 1, further comprising providing, by the SOA governance unit, input to identify, by the computer, the plurality of projects from each of the plurality of lines of business and to select the set of projects common to more than one line of business from the plurality of lines of business.

3. The method according to claim 2, further comprising coordinating, by the SOA governance unit, communication between each of the plurality of lines of business.

4. The method according to claim 2, further comprising evaluating, by the SOA governance unit, each of the plurality of projects to prioritize, by the computer, the set of business projects common to more than one line of business from the plurality of lines of business.

5. The method according to claim 1, the evaluating comprising:

preparing a business case for the SOA shared service opportunity; and prioritizing the set of projects common to more than one line of business from the plurality of lines of business based on the business case for the SOA shared service opportunity.

6. A system for minimizing duplication of resources comprising:

an enterprise system having a computer-based governance unit having computer executable instructions and a computer system installed on the enterprise system having a plurality of resources;

at least one processing unit;

memory operably associated with the at least one processing unit; and an opportunity tool storable in memory and executable by the at least one processing unit, the opportunity tool comprising:

an identification component configured to:

identify, by the shared services computer, a plurality of projects for each of a plurality of lines of business based on input from a SOA governance unit regarding availability of a resource passed from a device, each of the plurality of projects being a project that is proposed to be undertaken;

compare, by each line of business, each of the plurality of projects to qualification criteria created by the SOA governance unit to determine a measure of compliance with a set of business objectives of each of the plurality of projects for each of the plurality of lines of business;

generate a metric quantifying the measure of compliance with the set of business objectives of each of the plurality of projects for each of the plurality of lines of business, the metric being a web graph metric; and prioritize, by each line of business, each of the plurality of projects for each of the plurality of lines of business based on the metric;

prepare a high level business case for each of the plurality of projects, wherein each high level business case is prepared by a corresponding line of business, and wherein each high level business case receives oversight from the SOA governance unit;

a selection component configured to:

select, based on the high level business case for each of the plurality of projects, a set of projects from the plurality of projects for each of the plurality of lines of business common to more than one line of business from the plurality of lines of business; and re-prioritize, by the shared services computer, the plurality of projects for each of the plurality of lines of business selected as common to more than one line of business; and an evaluation component configured to:

evaluate the set of projects common to more than one line of business from the plurality of lines of business, based on the re-prioritization of the plurality of projects, to identify an optimum common project as a service oriented architecture (SOA) shared service opportunity;

build, by the shared services computer, the optimum common project as a shared service that is software code that re-uses components and merges duplicated resources and provides a common project across the multiple lines of business together with an associated lifecycle management process that includes new and distinct roles, governance checkpoints, increased collaboration requirements, and new decision control points using touch-points inside and outside of the organization within a SOA shared services plan;

modifying one or more existing systems in the infrastructure to deploy the optimum common project into an enterprise services portfolio that performs a shared service within the enterprise services portfolio for the more than one line of business; and manage the optimum common project as a shared service within the SOA based on the touchpoints and checkpoints.

7. The opportunity tool according to claim 6, wherein the SOA governance unit provides input to identify the plurality of projects from each of the plurality of lines of business and to select the set of projects common to more than one line of business from the plurality of lines of business.

8. The opportunity tool according to claim 7, wherein the SOA governance unit coordinates communication between each of the plurality of lines of business.

9. The opportunity tool according to claim 7, wherein the SOA governance unit evaluates each of the plurality of projects to prioritize the set of business projects common to more than one line of business from the plurality of lines of business.

10. The opportunity tool according to claim 6, the evaluation component further configured to:

prepare a business case for the SOA shared service opportunity; and prioritize the set of projects common to more than one line of business from the plurality of lines of business based on the business case for the SOA shared service opportunity.

11. A computer-readable hardware storage device storing computer instructions, which when executed, enables a computer system to minimize duplication of resources in an enterprise system having a computer-based governance unit having computer executable instructions and a computer system installed on the enterprise system having a plurality of resources, the computer instructions comprising:

identifying, by the shared services computer, a plurality of projects for each of a plurality of lines of business based on input from a SOA governance unit regarding availability of a resource passed from a device, each of the plurality of projects being a project that is proposed to be undertaken;

comparing, by each line of business, each of the plurality of projects to qualification criteria created by the SOA governance unit to determine a measure of compliance with a set of business objectives of each of the plurality of projects for each of the plurality of lines of business;

generating a visual metric quantifying the measure of compliance with the set of business objectives of each of the plurality of projects for each of the plurality of lines of business, the visual metric being a web graph metric;

prioritizing, by each line of business, each of the plurality of projects for each of the plurality of lines of business based on the metric;

preparing a high level business case for each of the plurality of projects, wherein each high level business case is prepared by a corresponding line of business, and wherein each high level business case receives oversight from the SOA governance unit;

selecting, based on the high level business case for each of the plurality of projects, a set of projects from the plurality of projects for each of the plurality of lines of business common to more than one line of business from the plurality of lines of business;

re-prioritizing, by the shared services computer, the plurality of projects for each of the plurality of lines of business selected as common to more than one line of business;

evaluating the set of projects common to more than one line of business from the plurality of lines of business, based on the re-prioritization of the plurality of projects, to identify an optimum common project as a service oriented architecture (SOA) shared service opportunity;

building, by the shared services computer, the optimum common project as a shared service that includes a software code that re-uses components and merges duplicated resources and provides a common project across the multiple lines of business together with an associated lifecycle management process that includes new and distinct roles, governance checkpoints, increased collaboration requirements, and new decision control points using touch-points inside and outside of the organization within a SOA shared services plan;

modifying one or more existing systems in the infrastructure to deploy the optimum common project into an enterprise services portfolio that performs a shared service within the enterprise services portfolio for the more than one line of business; and managing the optimum common project as a shared service within the SOA based on the touchpoints and checkpoints.

12. The computer-readable hardware storage device according to claim 11, wherein a SOA governance unit provides input to identify the plurality of projects from each of the plurality of lines of business and to select the set of projects common to more than one line of business from the plurality of lines of business.

13. The computer-readable hardware storage device according to claim 12, wherein the SOA governance unit coordinates communication between each of the plurality of lines of business.

14. The computer-readable hardware storage device according to claim 12, wherein the SOA governance unit evaluates each of the plurality of projects to prioritize the set of business projects common to more than one line of business from the plurality of lines of business.

15. The computer-readable hardware storage device according to claim 11, the computer instructions for evaluating further comprising:

preparing a business case for the SOA shared service opportunity; and prioritizing the set of projects common to more than one line of business from the plurality of lines of business based on the business case for the SOA shared service opportunity.

16. A method for deploying an opportunity tool for use in a computer system that minimizes duplication of resources in an enterprise system having a computer-based governance unit having computer executable instructions and a computer system installed on the enterprise system having a plurality of resources, comprising:

providing a computer infrastructure operable to:

identify, by the shared services computer, a plurality of projects for each of a plurality of lines of business based on input from a SOA governance unit regarding availability of a resource passed from a device, each of the plurality of projects being a project that is proposed to be undertaken;

compare, by each line of business, each of the plurality of projects to qualification criteria created by the SOA governance unit to determine a measure of compliance with a set of business objectives of each of the plurality of projects for each of the plurality of lines of business;

generate a metric quantifying the measure of compliance with the set of business objectives of each of the plurality of projects for each of the plurality of lines of business, the metric being a web graph metric;

prioritize, by each line of business, each of the plurality of projects for each of the plurality of lines of business based on the metric;

prepare a high level business case for each of the plurality of projects, wherein each high level business case is prepared by a corresponding line of business, and wherein each high level business case receives oversight from the a SOA governance unit;

select, based on the high level business case for each of the plurality of projects, a set of projects from the plurality of projects for each of the plurality of lines of business common to more than one line of business from the plurality of lines of business;

re-prioritize, by the shared services computer, the plurality of projects for each of the plurality of lines of business selected as common to more than one line of business; and evaluate the set of projects common to more than one line of business from the plurality of lines of business, based on the re-prioritization of the plurality of projects, to identify a SOA shared service opportunity;

evaluate the set of projects common to more than one line of business from the plurality of lines of business, based on the re-prioritization of the plurality of projects, to identify an optimum common project as a service oriented architecture (SOA) shared service opportunity;

building, by the shared services computer, the optimum common project as a shared service that is software code that re-uses components and merges duplicated resources and provides a common project across the multiple lines of business together with an associated lifecycle management process that includes new and distinct roles, governance checkpoints, increased collaboration requirements, and new decision control points using touch-points inside and outside of the organization within a SOA shared services plan;

modifying one or more existing systems in the infrastructure to deploy the optimum common project into an enterprise services portfolio that performs a shared service within the enterprise services portfolio for the more than one line of business; and managing the optimum common project as a shared service within the SOA based on the touchpoints and checkpoints.

17. The method according to claim 16, wherein a SOA governance unit provides input to identify the plurality of projects from each of the plurality of lines of business and to select the set of projects common to more than one line of business from the plurality of lines of business.

18. The method according to claim 17, wherein the SOA governance unit coordinates communication between each of the plurality of lines of business.

19. The method according to claim 17, wherein the SOA governance unit evaluates each of the plurality of projects to prioritize the set of business projects common to more than one line of business from the plurality of lines of business.

20. The method according to claim 16, the computer infrastructure operable to evaluate further operable to:

prepare a business case for the SOA shared service opportunity; and prioritize the set of projects common to more than one line of business from the plurality of lines of business based on the business case for the SOA shared service opportunity.

* * * * *